Feb. 26, 1952 — A. A. JULIANO — 2,586,954
CAMERA SUPPORT
Filed Oct. 7, 1949
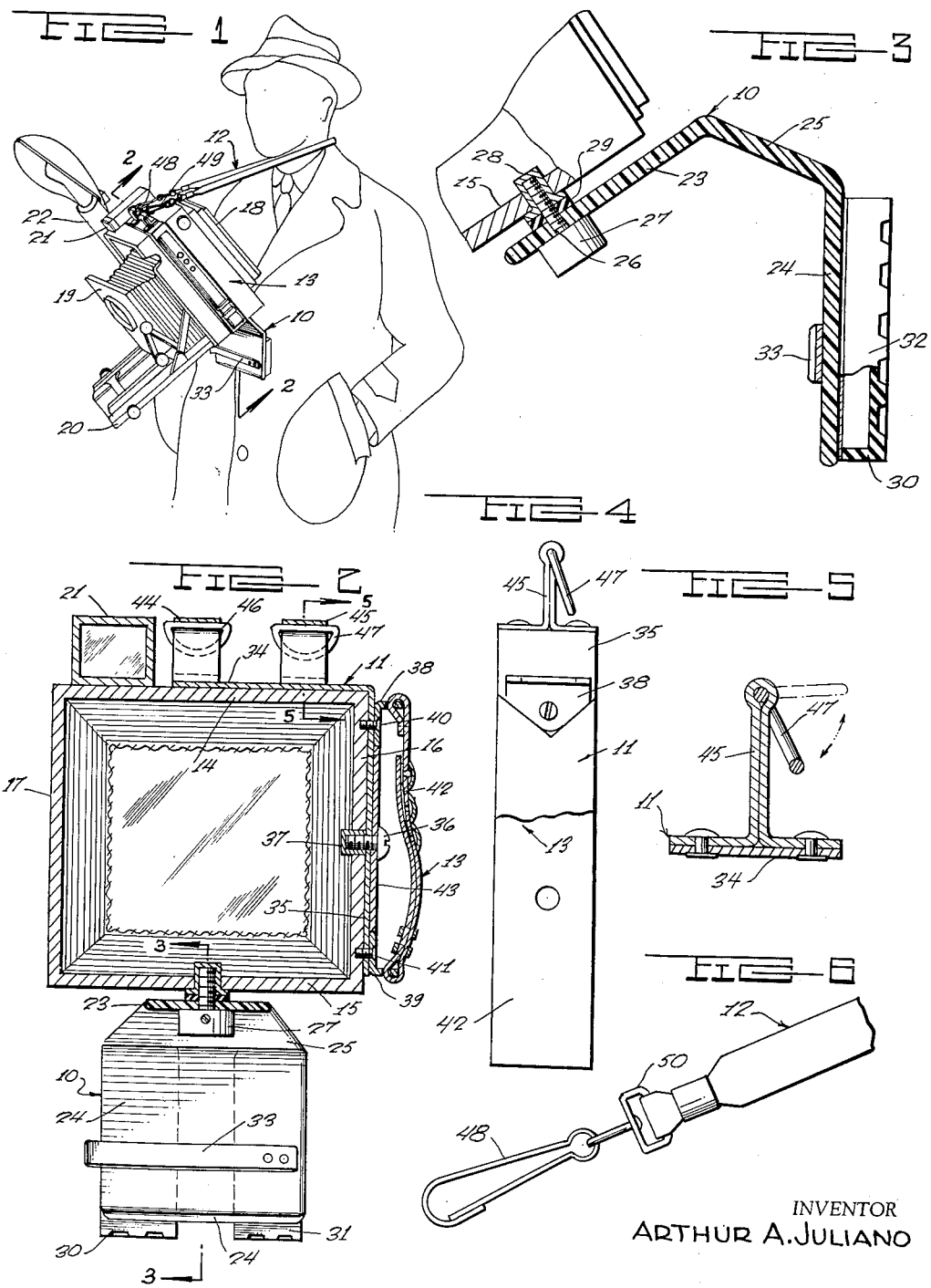
INVENTOR
ARTHUR A. JULIANO
BY
McMorrow, Berman & Davidson
ATTORNEYS Patented Feb. 26, 1952

2,586,954

UNITED STATES PATENT OFFICE 2,586,954

CAMERA SUPPORT

Arthur A. Juliano, Kansas City, Mo.

Application October 7, 1949, Serial No. 120,090

1 Claim. (Cl. 95—86)

This invention relates to camera supports, and more particularly to a support for supporting a camera at various heights and angles on the person of a photographer.

It is among the objects of the invention to provide an improved camera support including a base plate attachable to the camera by the camera tripod-attaching screw, a neck strap attachable by a bracket to the upper side of the camera and a carrying handle attachable to the camera by such bracket, all without material modification of the camera construction, which support will hold a camera firmly in position on the person of a photographer at various levels and inclinations so that the camera can be operated without movement or vibration and can be supported without use of the photographer's hands, leaving the hands free for changing films and lenses, operating flashlight apparatus and for other purposes, and which support is simple and durable in construction, economical to manufacture, neat and attractive in appearance, and attachable to different types of cameras without substantial modification.

Other objects and advantages will become apparent from a consideration of the following description and the appended claim in conjunction with the accompanying drawing, wherein:

Figure 1 is a somewhat diagrammatic illustration of a camera supported in operative position on the person of a photographer by a camera support, illustrative of the invention;

Figure 2 is a cross-section of the camera and camera support substantially on the line 2—2 of Figure 1 and looking in the direction of the arrows;

Figure 3 is a cross-section on an enlarged scale of a fragmentary portion of the camera and a camera-supporting base plate, and is taken substantially on the line 3—3 of Figure 2;

Figure 4 is a side elevation of one component of the camera support, a portion being broken away to more clearly illustrate the construction thereof;

Figure 5 is a cross-section on an enlarged scale of a fragmentary portion of the support component shown in Figure 4, and is taken substantially on the line 5—5 of Figure 2; and Figure 6 is an elevation of a fragmentary end portion of a neck strap constituting a component of the camera support.

With continued reference to the drawing, the camera support comprises, in general, a base plate 10 attachable to the camera by the usual tripod screw threaded into a screw-receiving socket provided in the bottom side of the camera, a right-angular bracket 11 receiving an upper corner of the camera and attached to the camera by a screw threaded into another tripod screw-receiving socket provided in a side wall of the camera, a neck strap 12 detachably secured at its ends to the leg of the bracket 11 at the upper side of the camera, and a carrying handle 13 secured to the other leg of the bracket 11.

The arrangement is such that the base plate 10 provides a rest or fulcrum positioned to bear upon the chest of the photographer, at the bottom of the camera, while the neck strap 12 passes around the photographer's neck and supports the upper end of the camera, as is clearly illustrated in Figure 1. By moving the plate 10 upwardly or downwardly the elevation and inclination of the camera can be changed, as may be desired, and the camera can be supported entirely without the use of the hands of the photographer.

The camera illustrated has a rectangular, box-like body including top and bottom walls 14 and 15, respectively, side walls 16 and 17, a rear film-receiving wall 18 and a movable, lens-carrying wall 19 mounted at its bottom edge on a guideway 20 hinged to the bottom wall 15 and normally providing a closure for the front side of the camera. A conventional view finder 21 is mounted on the top wall of the camera near the end of the top wall connected to the upper end of the side wall 17, and flashlight equipment 22 is shown attached to the camera along the side wall 17.

The base plate 10 is a thin-walled body of suitable material, such as a hard rubber or a synthetic resin plastic, having two legs 23 and 24 disposed at an angle of approximately 45-degrees to each other, and interconnected at their adjacent ends by an intermediate portion 25.

The leg 23 is rectangular in shape, and is provided, near its outer end with an aperture 26 through which is inserted a screw 27 threaded into a tripod screw-receiving socket 28 provided in the bottom wall of the camera. The screw 27 securely attaches the base plate 10 to the bottom wall of the camera and, if desired, a washer 29 of resilient material can be disposed between the base plate and the outer end of the socket 28 to render this connection slightly resilient and hold the leg 23 of the base plate in spaced relationship to the bottom wall of the camera.

The base plate leg 24 is substantially square in shape, and has secured, on its outer side, two rectangular pads 30 and 31 of suitable, resilient material, such as rubber. These pads 30 and 31 are secured to the base plate by suitable means, such as by being cemented thereto, and spaced apart in substantially parallel relationship and are preferably hollow, as is clearly illustrated in Figure 3, to give greater resiliency to their outer surfaces. The outer surfaces of the pads are roughened or provided with transverse ribs 32 to augment the frictional effect of these surfaces, so that the pads will not slip on the clothing of the photographer carrying the camera.

A flat spring 33 is connected, near one end, to the base plate leg 24 on the side of the leg opposite the pads 30 and 31, and extends transversely across this leg of the base plate to hold such objects as memoranda sheets and similar flat objects.

The right-angular or L-shaped bracket 11 is preferably formed of flat metal stock and comprises two legs 34 and 35 disposed substantially at right angles to each other and having a length somewhat less than the length of the corresponding side and top walls of the camera.

The leg 35 is provided with an aperture which receives a screw 36 which screw is threaded into a tripod screw-receiving socket 37 provided in the side wall 16 of the camera to detachably secure the bracket 11 to the camera. The handle 13 comprises a pair of apertured angle members 38 and 39 secured to the leg 35 near respectively-opposite ends of the latter, by suitable means, such as the screws 40 and 41, and providing eyes receiving the looped ends of the handle strap 42. A plate 43 is placed on the intermediate portion of the leg 35 and apertured to receive the screw 36 providing a flush surface with the eye members 38 and 39.

Two upstanding loop formations 44 and 45 are secured to the bracket leg 34 at spaced-apart locations therealong, and D-shaped rings 46 and 47 are pivotally secured in the upper or outer ends of these loop formations, respectively.

The neck strap 12 is an elongated strap of flexible material, such as leather, having secured to the opposite ends thereof snap hooks 48 and 49 which are respectively engageable with the rings 46 and 47. These hooks are preferably secured to the ends of the strap by swivel connections, as indicated at 50 in Figure 6.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

The combination with a camera of a camera support assembly comprising a rest secured to the camera at one side of the latter and adapted to bear on the chest of a person supporting the camera, a bracket secured to the camera at the side thereof opposite said one side, and an elongated flexible element secured at its ends to said bracket and adapted to extend around the neck of a person supporting the camera to support the camera in picture taking position, said rest comprising a plate like structure having two flat legs disposed at an angle less than 90 degrees to each other, a screw carried by one of said legs and attaching said rest to the camera, and a pad of resilient material secured to the other of said legs and having a friction augmenting outer surface.

ARTHUR A. JULIANO.

REFERENCES CITED

The following references are of record in the file of this patent:

UNITED STATES PATENTS

| Number | Name | Date |
| --- | --- | --- |
| 332,123 | Walton | Dec. 8, 1885 |
| 817,207 | Wheeler | Apr. 10, 1906 |
| 1,993,485 | Paul | Mar. 5, 1935 |
| 2,270,931 | Corcoran | Jan. 27, 1942 |
| 2,357,377 | Bausch | Sept. 5, 1944 |
| 2,437,405 | Robinson | Mar. 9, 1948 |